(12) United States Patent
Medina

(10) Patent No.: US 8,385,208 B1
(45) Date of Patent: *Feb. 26, 2013

(54) METHOD AND APPARATUS FOR PREVENTING HEAD OF LINE BLOCKING AMONG ETHERNET SWITCHES

(75) Inventor: Eitan Medina, Ramat Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 154 days.

This patent is subject to a terminal disclaimer.

(21) Appl. No.: 12/608,921

(22) Filed: Oct. 29, 2009

Related U.S. Application Data

(63) Continuation of application No. 10/955,893, filed on Sep. 29, 2004, now Pat. No. 7,613,116.

(51) Int. Cl.
*H04L 1/00* (2006.01)

(52) U.S. Cl. .......... 370/236; 370/237; 370/400

(58) Field of Classification Search .......... 370/229–235, 370/237, 252–253, 400, 401, 468; 709/223–225, 709/238–244
See application file for complete search history.

(56) References Cited

U.S. PATENT DOCUMENTS

| | | | |
|---|---|---|---|
| 5,790,891 A | 8/1998 | Solt et al. | |
| 5,809,557 A | 9/1998 | Shemla et al. | |
| 5,841,722 A | 11/1998 | Willenz | |
| 5,913,042 A | 6/1999 | Shemla et al. | |
| 5,923,660 A | 7/1999 | Shemla et al. | |
| 5,930,261 A | 7/1999 | Shemla et al. | |
| 5,999,981 A | 12/1999 | Willenz et al. | |
| 6,240,065 B1 | 5/2001 | Medina et al. | |
| 6,424,624 B1 | 7/2002 | Galand et al. | |
| 6,601,116 B1 | 7/2003 | Shemla et al. | |
| 6,667,985 B1 | 12/2003 | Drummond-Murray | |
| 6,678,278 B2 | 1/2004 | Medina et al. | |
| 6,738,838 B2 | 5/2004 | Shemla et al. | |
| 7,180,857 B2 | 2/2007 | Kawakami et al. | |
| 7,372,814 B1 * | 5/2008 | Chiruvolu et al. | 370/235 |
| 7,577,136 B1 * | 8/2009 | Devanagondi et al. | 370/389 |
| 2001/0050913 A1 | 12/2001 | Chen et al. | |
| 2002/0126699 A1 * | 9/2002 | Cloonan et al. | 370/468 |
| 2002/0159459 A1 | 10/2002 | Nagatomo et al. | |
| 2002/0176363 A1 | 11/2002 | Durinovic-Johri et al. | |
| 2003/0026206 A1 * | 2/2003 | Mullendore et al. | 370/230 |
| 2003/0048750 A1 | 3/2003 | Kobayashi | |
| 2003/0218977 A1 * | 11/2003 | Pan et al. | 370/230 |
| 2005/0078602 A1 | 4/2005 | Mancour et al. | |
| 2006/0159094 A1 | 7/2006 | Gummalla et al. | |
| 2007/0171914 A1 | 7/2007 | Kadambi et al. | |

\* cited by examiner

*Primary Examiner* — Pao Sinkantarakorn

(57) ABSTRACT

An Ethernet switch for preventing head of line blocking by passing an Ethernet packet carrying congestion status information among Ethernet switches over the Ethernet. When a port of an Ethernet switch is congested, the switch informs other Ethernet switches by broadcasting to other switches over the Ethernet an Ethernet packet indicating that the port is congested. If another Ethernet switch finds that one of its traffic classes is destined to the congested port, this switch drops packets of that traffic flow until receiving an Ethernet packet indicating that the congestion is alleviated.

20 Claims, 5 Drawing Sheets

| Destination MAC |
| Source MAC |
| Length/Type |
| MAC Control Opcode |
| MAC Control Parameters |
| Switch# (8bits), bitmap (32bit)<br>Switch# (8bits), bitmap (32bit)<br>Switch# (8bits), bitmap (32bit)<br>Switch# (8bits), bitmap (32bit)<br>......<br>Reserved (fill with zero value) |
| CRC |

Figure 4a

| Destination MAC |
| Source MAC |
| Type = InterSwtch link |
| Interswitch parameters:<br>Switch# (8bits), bitmap (32bit)<br>Switch# (8bits), bitmap (32bit)<br>Switch# (8bits), bitmap (32bit)<br>Switch# (8bits), bitmap (32bit)<br>......<br>Reserved (fill with zero value) |
| CRC |

Figure 4b

METHOD AND APPARATUS FOR PREVENTING HEAD OF LINE BLOCKING AMONG ETHERNET SWITCHES

CROSS-REFERENCE TO RELATED APPLICATIONS

This application is a continuation of U.S. application Ser. No. 10/955,893, filed Sep. 29, 2004, now U.S. Pat. No. 7,613, 116; said patent is incorporated by reference in its entirety. This application also incorporates by reference U.S. application Ser. No. 10/955,892, filed on Sep. 29, 2004, and entitled Method And Apparatus For Preventing Head Of Line Blocking In An Ethernet System.

FIELD OF THE INVENTION

The present invention relates to networking, and more specifically to traffic flow control in Ethernet networks.

BACKGROUND OF THE INVENTION

FIG. 1 shows a block diagram of a conventional Ethernet switching system. As shown, the Ethernet system comprises backplane switches 101 and 102, communicating with each other via a trunk line 103. The Ethernet system also comprises a plurality of line cards, including line cards 104, 105, and 106. Each of the line cards includes a switch, such as a switch 1041 in the line card 104, a switch 1051 in the line card 105, and a switch 1061 in the line card 106. Each of the switches communicates with a backplane switch (either of backplane switches 101 or 102). As a result, the line cards communicate with each other through the switches 1041, 1051 and 1061 and the backplane switches 101 and 102.

In the line card 104, CPUs 1042 and 1043 communicate with each other via a network interface 1045, the switch 1041, and a network interface 1044. In the line card 105, CPUs 1052 and 1053 communicate with each other via a network interface 1055, the switch 1051, and a network interface 1054. In the line card 106, CPUs 1062 and 1063 communicate with each other via a network interface 1065, the switch 1061, and a network interface 1064. A CPU and a network interface may be connected over a bus (e.g. a PCI Express bus), while other lines in the system are Ethernet connections.

It should be noted that the network interface functionality within blocks 1044, 1045, 1054, 1055, 1064 and 1065 may be implemented in any number of ways, whether as a chip, a portion of a chip, a card, or a portion of a card.

An Ethernet switch has information about its own ports, so that the switch can receive a packet and switch it over to the right port by examining the content of the packet and component information inside the switch. The switches do not exchange any information in real time, because of the use of standard Ethernet connectivity.

Congestion can occur in various situations. For example, traffic flow may proceed from the CPU 1063 in the line card 106 to the CPU 1053 in the line card 105 via the switch 1061, the backplane switches 101 and 102, and the switch 1051. Other traffic flow may proceed from the CPU 1052 in the line card 105 to the CPU 1053 in the same line card via the switch 1051. If these two traffic flows try to exit the same egress port of the switch 1051, congestion can occur.

In another example, a first traffic flow may proceed from the CPU 1063 in the line card 106 to the CPU 1053 in the line card 105, and a second traffic flow may proceed from the CPU 1062 in the same line card 106 to the CPU 1042 in the line card 104. The two traffic flows from the same line card go to different respective destination ports. The paths of the two traffic flows partially overlap each other, i.e., the part from the switch 1061 to the backplane switch 102 and then to the backplane switch 101. If the egress port of the switch 1051 is congested, but the switch 1061 does not know about the congestion, the switch 1061 may continue to switch packets from the CPUs 1062 and 1063 based on a predetermined policy. For example, it may provide 50% of the uplink traffic to the traffic flow from the CPU 1062, and the remaining 50% of the uplink traffic to the traffic flow from the CPU 1063. Consequently, although there is no congestion on the path from the CPU 1062 to the CPU 1042, only 50% of the traffic flow from the CPU 1062 will pass to its destination.

However, if the switch 1061 knew about the congestion, it could have employed a packet discard mechanism to remove the packets from the CPU 1063 at the outset, thus reducing the load on the entire switching system, and allowing traffic flow from the CPU 1062 to pass through with higher bandwidth.

Conventionally, the switches communicate the congestion information to one another via a proprietary line 110. However, such a proprietary line is not cost effective.

Therefore, it would be desirable to provide a method and apparatus for communicating congestion information among the switches over a more cost effective route.

SUMMARY OF THE INVENTION

In view of the foregoing, it is an object of the present invention to provide an apparatus and method for preventing head of line blocking by passing congestion information among switches over an Ethernet connection. When a switch port is congested, the switch broadcasts the congestion information to other switches over an Ethernet connection. If a second switch finds that one of its traffic flows is destined to go to the congested port, the second switch drops packets of that traffic flow until the congested port stops broadcasting congestion information. Thus, the second switch removes the packets destined to the congested port at the outset, and reduces the load on the entire switching system.

BRIEF DESCRIPTION OF THE DRAWINGS

Embodiments of the present invention are described herein with reference to the accompanying drawings, similar reference numbers being used to indicate functionally similar elements.

FIGS. 4A and 4B show data frames with congestion information according to embodiments of the present invention.

DETAILED DESCRIPTION OF EMBODIMENTS

Objects and advantages of the present invention will become apparent from the following detailed description.

Figure 1:
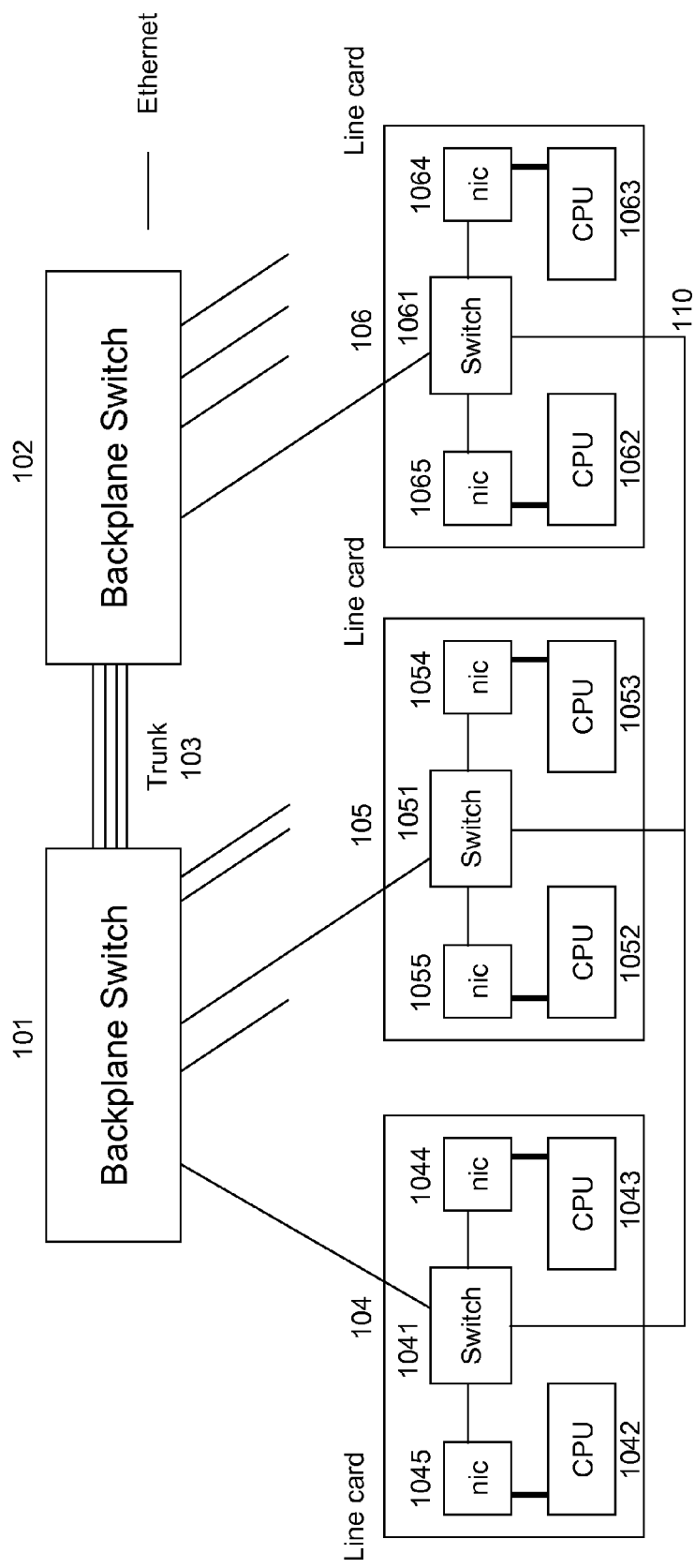
FIG. 1 shows a block diagram of a conventional Ethernet switching system.
Figure 2:
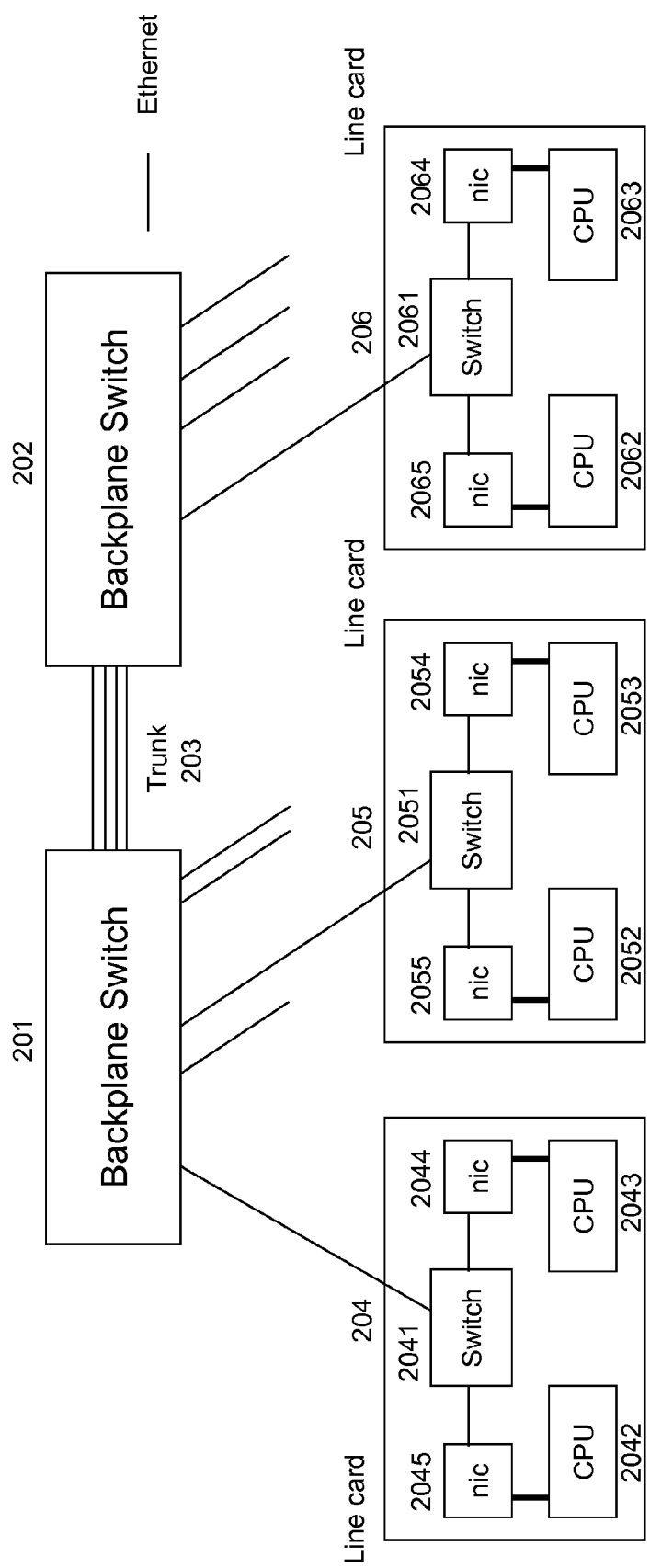
FIG. 2 shows a block diagram of an Ethernet switching system according to one embodiment of the present invention.

FIG. 2 shows a block diagram of an Ethernet switching system according to one embodiment of the present invention. The system shown in FIG. 2 is similar to that shown in FIG. 1, except that it does not have a proprietary line (110 in FIG. 1) for communicating congestion information among the line card switches. Instead, the congestion information is exchanged among the line card switches over an Ethernet connection.

As known in the art, head of line blocking describes a situation in which one traffic flow in a switching system, even a relatively low priority traffic flow, could block other, potentially higher priority traffic flows. According to one embodiment of the present invention, the switches exchange information in real time over the Ethernet to provide information on whether their egress ports are being congested. A switch can decide the target of each of its traffic classes using tables, such as MAC tables. Based on the congestion status information from other switches, a switch can decide whether one of its traffic classes is destined to a target that is suffering from congestion. If so, the switch can decide to drop packets destined to the congested target. The switch can also increase its bandwidth for traffic classes destined to targets which are not suffering from congestion.

As shown in FIG. 2, the switches communicate congestion information with each other using standard Ethernet packets. These packets convey congestion information that is only communicated among the switches without being output outside of the Ethernet switching system. In the first instance, a management module enables the switches to know the topology of the network.

Figure 3:
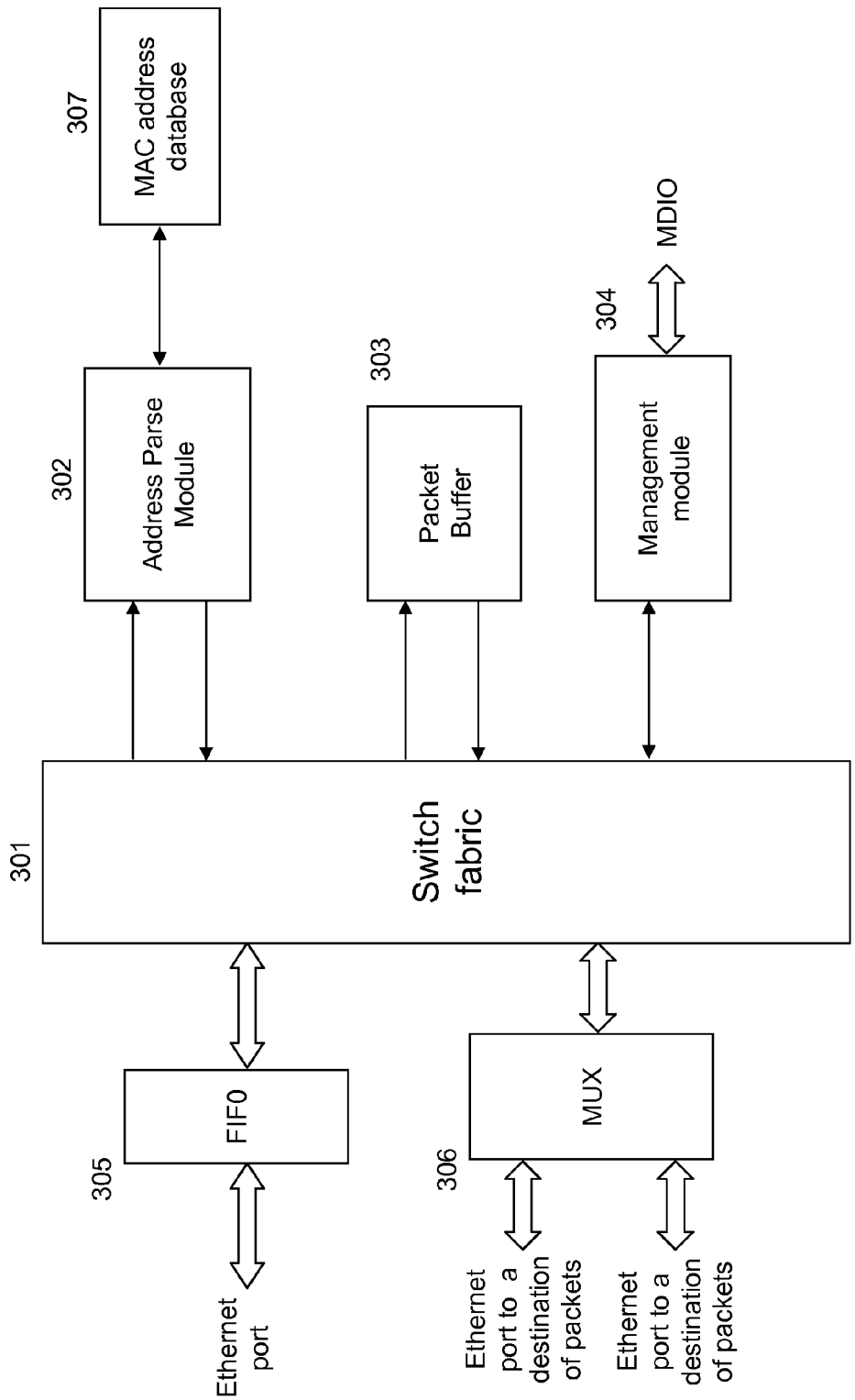
FIG. 3 shows a block diagram of a switch according to one embodiment of the present invention.

FIG. 3 shows a block diagram of an Ethernet switch according to one embodiment of the present invention. These correspond to the switches shown in the line cards of FIG. 2. The switch comprises switch fabric 301, an address parse module 302, a packet buffer module 303, a management module 304, a first in first out (FIFO) 305, and a multiplexer (MUX) 306, all of which communicate with the switch fabric 301. In addition, the management module 304 communicates with management data I/O (MDIO), and the address parse module communicates with a MAC address database 307. The FIFO 305 communicates with the Ethernet port to the backplane switch, and the MUX 305 communicates with two Ethernet ports to destination of packets.

Because the MAC addresses are known throughout the switching system, the management module 304 of the switch 2061 informs the switch 2061 that a packet going to a certain destination MAC address, such as that of the CPU 2053, is going to pass through a certain path in the Ethernet switching system, and eventually be output to the egress port of the switch 2051. Thus, upon receipt of the packets, the switch 2061 determines their egress ports by looking up in its MAC address database, and then determines whether there is a reason to discard the packet on reception in order to avoid blockage.

According to one embodiment of the present invention, the MAC database in each switch stores not only information about local ports on the switch and the final destination ports of the packets, but also a plurality of paths (in different embodiments, the number could be two or more) through which the packets can go to their destinations, so as to avoid congestion. All switches constantly exchange information about loading status at their ports, thus allowing a switch to decide whether to remove certain packets, and whether to change paths for certain packets.

According to another embodiment of the present invention, a server may consider not only the output ports of the switches, but also the output queue. Usually, there are several output queues of packets on each egress port of a switch. If the originating switch knows not only the egress port status of other switches on the path of the traffic flow, but also the egress queue status of such switches, the originating switch can determine the queue that a input packet is going into. By taking the output queue into account, this embodiment not only prevents head of line blocking, but also improves quality of service.

The switch of the present invention uses information on top of the Ethernet header to broadcast congestion information. An IEEE 802.3x compliant MAC control packet carrying congestion information is shown in FIG. 4a. As shown, the IEEE 802.3x compliant frame has a field for destination MAC address, a field for source MAC address, a field indicating the length and type of the frame, a field for MAC control opcode, a field for MAC control parameters, a filler, and a field for cyclic redundancy check (CRC).

IEEE 802.3x defines reserved bits in the filler. In one embodiment of the present invention, the filler is used to communicate congestion information among the Ethernet switches. As shown in FIG. 4a, the filler contains congestion information of a number of switches. The "switch #" is used to identify a switching device in the switching system. The 32 bit bitmap for each switch is the congestion information describing the port state of the switch. Each bit represents status of one port of a switch at a moment. Bit number 0 refers to port 0, bit number 31 refers to port 31, and so on. A value 0 means "not congested" and a value 1 means "congested." In one packet, every switch provides the congestion information about itself and accumulated congestion information it obtained from other switches. It should be understood that the bitmap could also be the congestion information describing the queue state of each switch.

In one embodiment, the congestion information is transported over a tag packet by putting a tag on a standard Ethernet packet. FIG. 4b shows an Ethernet packet carrying congestion information in the form of a tag. As shown, the packet has a field for destination MAC address, a field for source MAC address, a field for packet type, a filler, and a field for CRC. The field for packet type is a 2 byte field containing a value that is unused by any other protocol over Ethernet. This value is pre-programmed in all switches in the Ethernet system so that they recognize this packet as a special packet.

Congestion information of a number of switches is written into the filler as interswitch parameters. Similarly to the packet shown in FIG. 4a, a switch is identified by a "switch #", and a 32 bit bitmap is used to describe the congestion status of ports of each of the Ethernet switches.

Each port or queue is responsible for monitoring itself, and for detecting congestion. A switch usually limits the amount of resources that it dedicates to certain paths through the switch. In one embodiment, the switch monitors its packet buffer 303. Once it finds that traffic is being accumulated beyond a predetermined degree at a particular point, this port will be marked as being congested, and the corresponding bit in the bitmap for this port in the Ethernet packet will be changed to indicate the congestion. It should be understood that the present invention is not limited to the above method for detecting congestion. The method for detecting congestion could be any such method in the art.

When an egress port or a queue experiences congestion, it informs other switches about the congestion by broadcasting an Ethernet packet to other switches over the Ethernet ports that connect the switches. The congestion information is broadcast periodically, so the next broadcast will indicate whether a port, or a queue, continues to be congested. When the congestion at a port, such as the egress port of the switch 2051, or at a queue, is alleviated, the port will not be marked as being congested any more. The corresponding bit in the bitmap for this switch in the Ethernet packet will be changed to indicate "not congested", and the originating switch, such as the switch 2061, stops dropping packets destined to the previously congested port.

The switches contain databases of MAC addresses, which contain the port number associated with each address. The management module 304 of the switches receiving the broadcast congestion information then can associate the congestion state with the station containing the congested port.

The association of MAC addresses with congested ports or queues is one way of making routing decisions to prevent head of line blocking among Ethernet switches. It should be understood that other ways may be implemented, such as association of the congestion states with network addresses (e.g. IP), or network flows (combination of layer 2, layer 3 and TCP or UDP port numbers). The present invention is not limited to association of congestion states with any particular type of address.

When an originating switch receives the broadcast congestion information, it decides whether any traffic flow passing through the switch is destined to the congested port. If so, then the originating switch, such as the switch 2061 shown in FIG. 2, reduces the bandwidth of the traffic flow going to the congested port. The originating switch may decide to drop some of the packets going to the congested port, so as to allow the throughput along the path to be used by other traffic that is not going to the congested port. According to the protocol of the traffic flow going to the congested port, the switch may re-transmit the dropped packets, such as for data traffic; or may not re-transmit the dropped packets, such as in a real time video stream, depending on whether transmission quality will be sufficient without the dropped packets. Alternatively, the switch may drop the packets and let the originator and the final station(s) of the packet flow decide this by employing a mechanism in higher layers of the communication protocol, such as TCP/IP retransmission capability, or the ability of video CODECs to recover from lost frames, etc. It should be understood that the present invention is not limited to any particular packet discarding scheme. The methods for dropping packets, determining whether to re-transmit the dropped packets, and re-transmitting the dropped packets could be any method known in the art.

Furthermore, in another implementation, the congested information may be more elaborate than binary yes/no, and could include parametric congestion state per port, which indicates that, for example, this port can absorb another 20 Kilobytes before it is filled up. This is valuable in order to avoid heavy fluctuation that may be experienced when the indication is either congested or non-congested. Instead of the bitmap in FIGS. 4a and 4b, such a mechanism could be implemented by putting into the filler a parametric congestion value per port.

Figure 5:
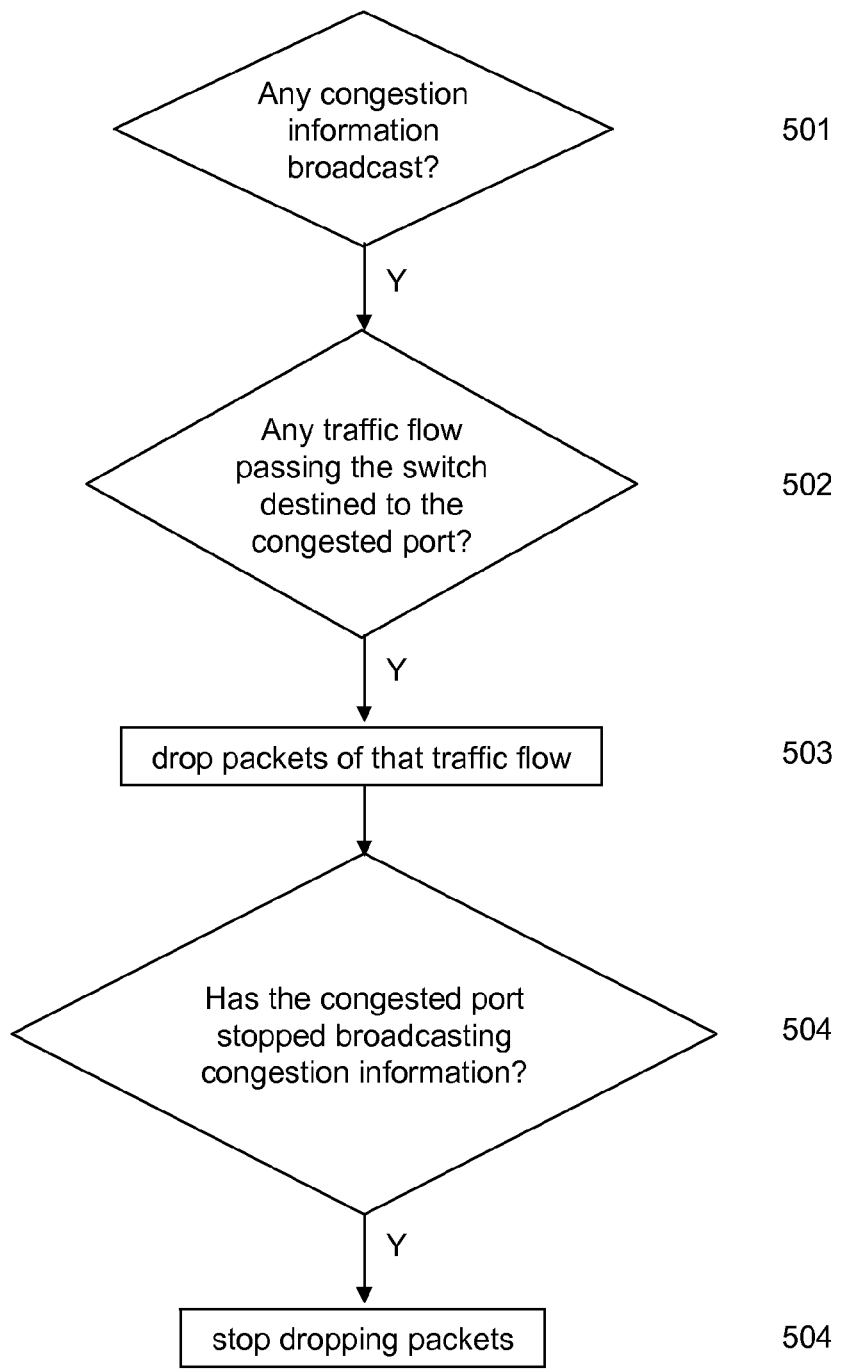
FIG. 5 shows a flow chart for traffic flow control in a switch according to one embodiment of the present invention.

FIG. 5 shows a flow chart for traffic flow control in a switch according to one embodiment of the present invention. At step 501, the management module of a switch decides whether congestion has occurred according to information broadcasted by other switches over the Ethernet. If yes, the management module decides whether there is any packet passing through the switch destined to the congested port at step 502. If yes, the management module drops packets destined to the congested port at step 503. At step 504, the management module decides whether the congestion at the congested port is alleviated. If yes, the management module stops dropping packets to that port at step 505.

It should be understood that a switch could both receive Ethernet packets carrying congestion status information from other switches and transmit Ethernet packets carrying congestion status information to other switches, or only receive Ethernet packets carrying congestion status information from other switches without transmitting congestion status information, or only transmit Ethernet packets carrying congestions status information without receiving the congestion status information.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. In a network comprising a plurality of Ethernet switches, a first Ethernet switch transmitting Ethernet traffic to a second Ethernet switch, the first Ethernet switch comprising:
a plurality of ports; and
a management module, communicating with the network, for receiving Ethernet packets containing congestion status information, for a plurality of other Ethernet switches in said network, in fillers of said Ethernet packets from at least said second Ethernet switch, said plurality of other Ethernet switches including said second Ethernet switch, and said fillers including a plurality of bits that are indicative of congestion status, wherein at least a subset of the plurality of bits is indicative of congestion status of corresponding different ports among ports of multiple Ethernet switches of said plurality of other Ethernet switches;
wherein the management module is configured to cause said first Ethernet switch to adjust its transmission of said Ethernet traffic to said second Ethernet switch responsively to said congestion status information that is contained in said fillers of said Ethernet packets and that is indicative of an amount of congestion at one or more ports of said second Ethernet switch.

2. The first Ethernet switch according to claim 1, wherein the management module is configured to cause said first Ethernet switch to adjust its transmission of said Ethernet traffic to said second Ethernet switch responsively to a bitmap, in each filler in each of said Ethernet packets, for at least said second Ethernet switch, each bit of the bitmap corresponding to a congestion status of a different port of said second Ethernet switch.

3. The first Ethernet switch according to claim 2, wherein the management module is configured to cause said first Ethernet switch to adjust its transmission of said Ethernet traffic to said second Ethernet switch responsively to a bitmap that is contained in each filler in each of said Ethernet packets and that contains said congestion status information, each bit of the bitmap corresponding to a congestion status of a different port of each one of said plurality of other Ethernet switches.

4. The first Ethernet switch according to claim 1, wherein the management module is configured to cause said first Ethernet switch to adjust its transmission of said Ethernet traffic to said second Ethernet switch responsively to a parametric congestion value that is contained in each filler in each of said Ethernet packets and that contains said congestion status information for each port of said plurality of other Ethernet switches in said network.

5. The first Ethernet switch according to claim 1 wherein, responsively to said congestion status information, the management module drops packets included in said Ethernet traffic that are destined to a congested port or queue of said second Ethernet switch.

6. The first Ethernet switch according to claim 5 wherein, responsively to said congestion status information, the management module determines whether to re-transmit the dropped packets.

7. The first Ethernet switch according to claim 5 wherein, based on said congestion status information, the management module further determines whether congestion of a congested port or queue is alleviated.

8. The first Ethernet switch according to claim 7 wherein, responsively to said congestion status information, the management module further stops dropping said packets included in said Ethernet traffic when congestion of the congested port or queue of said second Ethernet switch is alleviated.

9. The first Ethernet switch according to claim 1, wherein, responsively to said congestion status information, the management module reroutes said Ethernet traffic.

10. In a network comprising a plurality of Ethernet switches, a first Ethernet switch receiving Ethernet traffic from a second Ethernet switch, the second Ethernet switch comprising:
a plurality of ports; and
a management module, communicating with the network, for transmitting Ethernet packets containing congestion status information, for said plurality of Ethernet switches in the network, in fillers of said Ethernet packets, said fillers including a plurality of bits that are indicative of a congestion status, wherein at least a subset of the plurality of bits is indicative of an amount of congestion at corresponding different ports among ports of multiple Ethernet switches of said plurality of Ethernet switches, said plurality of Ethernet switches including said first Ethernet switch, and said second Ethernet switch being configured to adjust its transmission of said Ethernet traffic to said first Ethernet switch responsively to said congestion status information that is contained in said fillers of said Ethernet packets.

11. The second Ethernet switch according to claim 10, wherein the management module is configured to cause said second Ethernet switch to adjust its transmission of said Ethernet traffic to said first Ethernet switch responsively to a bitmap that is contained in each filler of said Ethernet packets and that contains said congestion status information, each bit of the bitmap corresponding to a congestion status of a different port of said first Ethernet switch.

12. The second Ethernet switch according to claim 10, wherein the management module is configured to cause said second Ethernet switch to adjust its transmission of said Ethernet traffic to said first Ethernet switch responsively to a parametric congestion value that is contained in each filler of said Ethernet packets and that contains said congestion status information for each port of said first Ethernet switch.

13. A network comprising a plurality of Ethernet switches, said network comprising:
a first Ethernet switch comprising:
a first plurality of ports; and
a first management module transmitting Ethernet packets containing congestion status information, for said plurality of Ethernet switches in said network, in fillers of said Ethernet packets, said fillers including a plurality of bits that are indicative of congestion, wherein at least a subset of the plurality of bits is indicative of congestion at corresponding different ports among ports of multiple Ethernet switches of said plurality of Ethernet switches;
said network further comprising:
a second Ethernet switch comprising:
a second plurality of ports; and
a second management module, receiving from said first Ethernet switch said Ethernet packets containing said congestion status information in said fillers, and configured to adjust its transmission of Ethernet traffic to said first Ethernet switch responsively to congestion status information that is contained in fillers of Ethernet packets and that is indicative of an amount of congestion at one or more ports of said first Ethernet switch.

14. A network according to claim 13, wherein the second management module is configured to cause said second Ethernet switch to adjust its transmission of said Ethernet traffic to said first Ethernet switch responsively to a bitmap that is contained in each filler of said Ethernet packets and that contains said congestion status information for said first Ethernet switch, each bit of the bitmap corresponding to congestion at a different port of said first Ethernet switch.

15. The network according to claim 14, wherein the second management module is configured to cause said second Ethernet switch to adjust its transmission of said Ethernet traffic to said first Ethernet switch responsively to a bitmap that is contained in each filler of said Ethernet packets and that contains said congestion status information, each bit of the bitmap corresponding to congestion at a different port of each of said plurality of Ethernet switches.

16. The first Ethernet switch according to claim 14, wherein responsively to said congestion status information, the second management module reroutes said Ethernet traffic.

17. The network according to claim 13, wherein the second management module is configured to cause said second Ethernet switch to adjust its transmission of said Ethernet traffic to said first Ethernet switch responsively to a parametric congestion value that is contained in each filler of said Ethernet packets and that contains said congestion status information for each port of said plurality of Ethernet switches in said network.

18. The network according to claim 13, wherein responsively to said congestion status information, the second management module drops packets included in said Ethernet traffic that are destined to a congested port or queue of said first Ethernet switch.

19. The network according to claim 18, wherein responsively to said congestion status information, the second management module determines whether to re-transmit the dropped Ethernet packets.

20. The system according to claim 18 wherein, responsively to said congestion status information, the second management module determines whether congestion of a congested port or queue is alleviated, and stops dropping said packets included in said Ethernet traffic when congestion of the congested port or queue of said first Ethernet switch is alleviated.

* * * * *